US005609375A

United States Patent [19]

Cohen

[11] Patent Number: 5,609,375

[45] Date of Patent: Mar. 11, 1997

[54] PERSONAL DEVICE FOR PAGE TURNING/TRANSFERRING

[76] Inventor: Efrat Cohen, 39 Beeri, 76351 Rehovot, Israel

[21] Appl. No.: 523,857

[22] Filed: Sep. 6, 1995

[51] Int. Cl.$^6$ ........ B25J 1/00

[52] U.S. Cl. ........ 294/25; 294/1.1

[58] Field of Search ........ 294/1.1, 25, 902; 224/217–219; 623/61–65; 40/531, 532; 271/33; 2/161.8

[56] References Cited

U.S. PATENT DOCUMENTS

| | | | |
|---|---|---|---|
| 746,803 | 12/1903 | Evans | 294/25 |
| 888,976 | 5/1908 | Duperrault | 294/25 |
| 1,149,834 | 8/1915 | James | 294/25 |
| 1,316,436 | 9/1919 | Feeney | 294/25 |
| 1,844,507 | 2/1932 | Gifford | 294/25 |
| 2,600,068 | 6/1952 | Meyers | 294/1.1 |
| 3,985,383 | 10/1976 | Yonkers | 294/25 |
| 4,606,484 | 8/1986 | Winter et al. | 294/25 |
| 5,251,943 | 10/1993 | Dalbo et al. | 294/25 |
| 5,390,971 | 2/1995 | Warren | 294/1.1 |

FOREIGN PATENT DOCUMENTS

| | | | |
|---|---|---|---|
| 852053 | 10/1952 | Germany | 294/1.1 |
| 267583 | 9/1929 | Italy | 294/25 |
| 2229130 | 9/1990 | United Kingdom | 294/25 |

*Primary Examiner*—Dean Kramer
*Attorney, Agent, or Firm*—Mark M. Friedman

[57] ABSTRACT

A personal device for facilitating the manual turning and transferring of pages by handicapped persons is provided. The device is in the form of a flexible or rigid padded bracelet which can be readily attached around the user's fingers, hand, forearm, foot or head. A delimited part of the exterior surface of the bracelet is overlaid with a two-sided adhesive material. The user presses the sticky surface against the page to be turned/transferred, then pulls it and releases the page by a slight movement. A rigid extension is attached to the bracelet, and used to prevent the turned page from turning back to its original position.

13 Claims, 7 Drawing Sheets

FIG. 1a
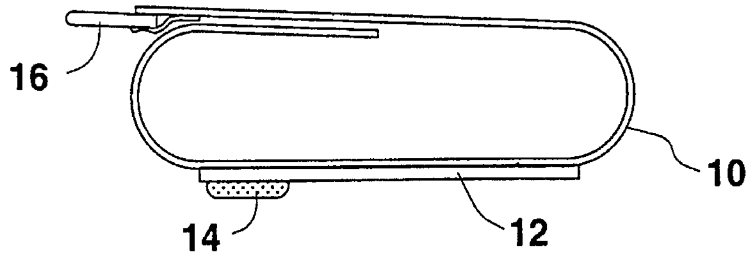
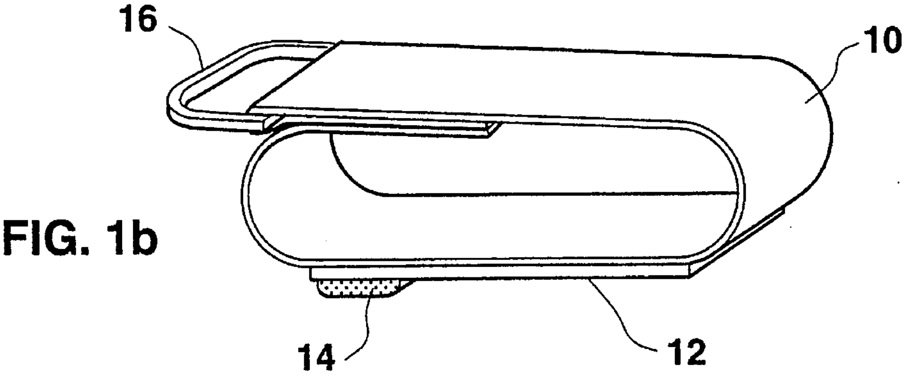
FIG. 1b
FIG. 2a
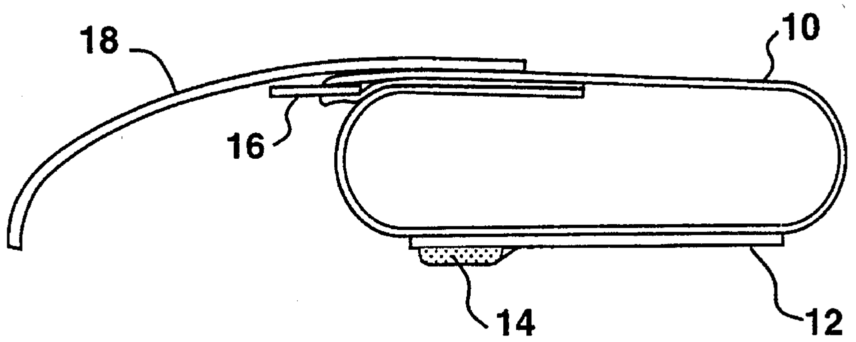
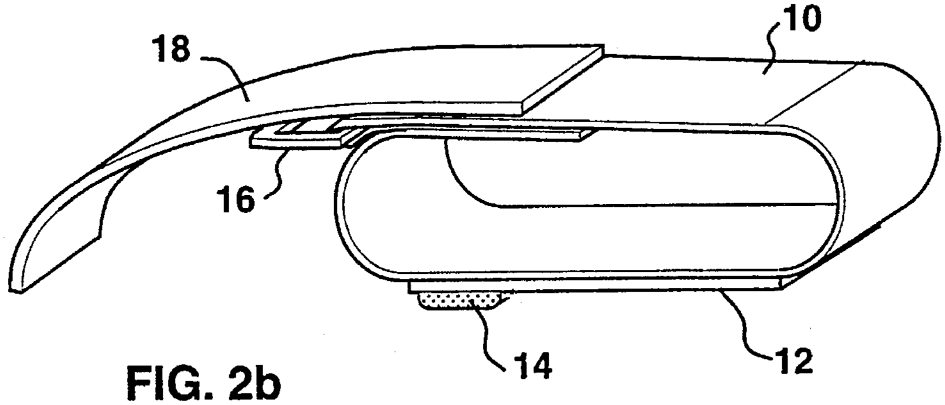
FIG. 2b

Fig. 6a
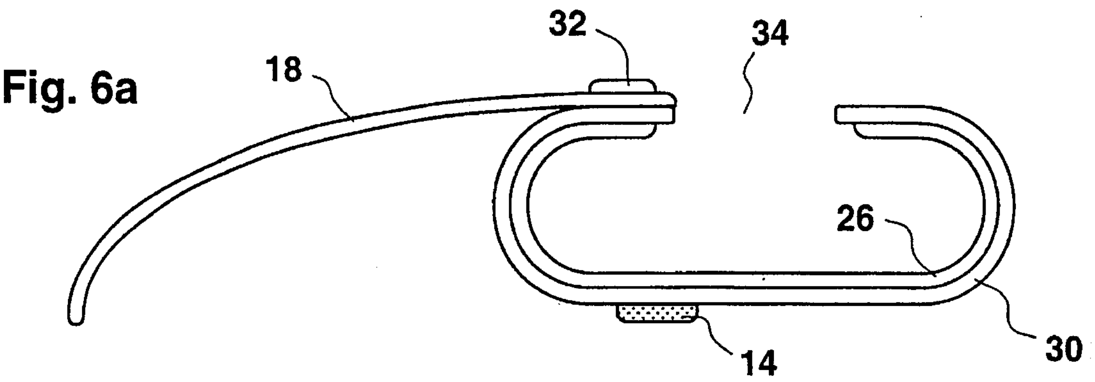
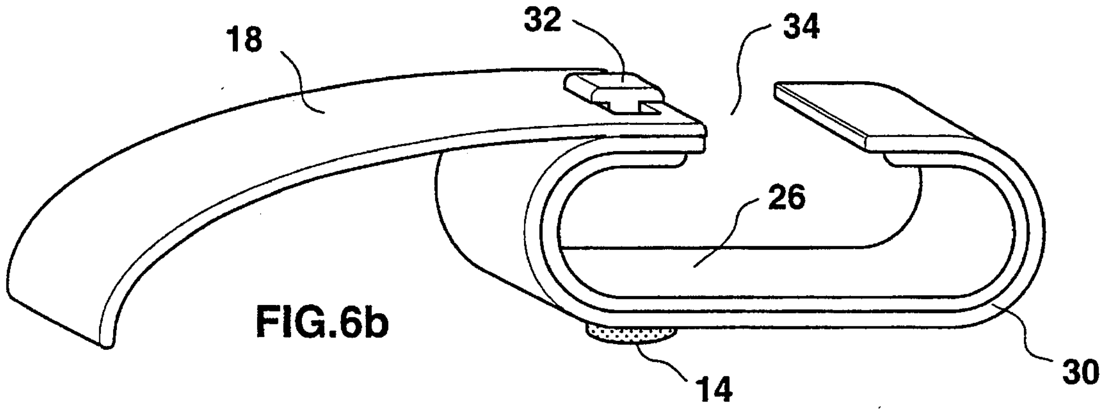
FIG.6b
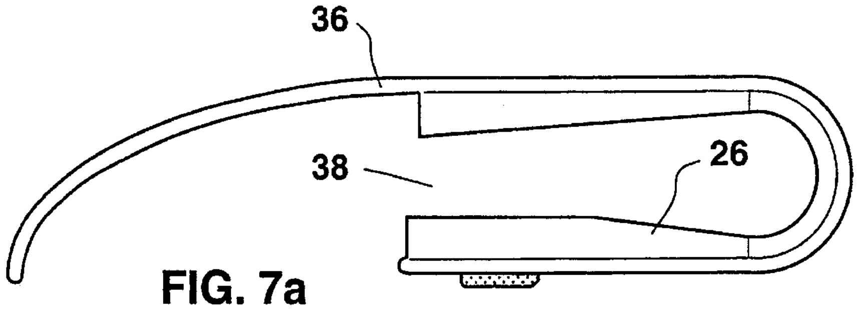
FIG. 7a
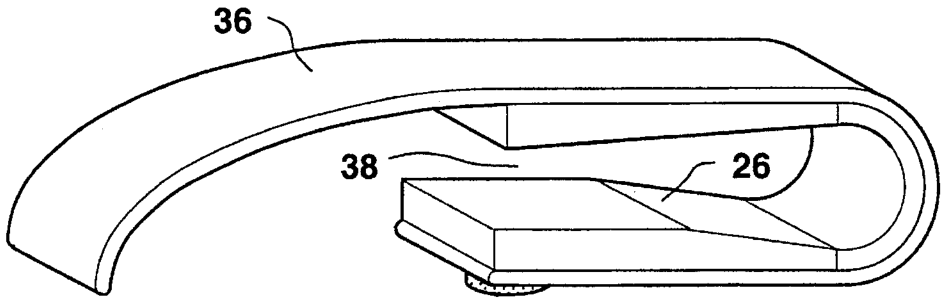
FIG. 7b

PERSONAL DEVICE FOR PAGE TURNING/TRANSFERRING

FIELD AND BACKGROUND OF THE INVENTION

The present invention relates to a personal device for facilitating the turning/transferring of pages and, more particularly, to a personal device which enables handicapped persons who permanently or temporarily lack the manual motor dexterity required for turning pages of a book, to perform such a function, as well as other functions related to handling of pages, such as sorting, linking and transferring of pages from one place to another.

Turning pages of a book is a trivial and daily function for a capable person, but nevertheless requires dexterous motor capability of the hand and fingers. However, lack of such motor capability is expressed in individuals who suffer from disability of their fingers, hand, forearm or entire arm owing to: amputation of fingers/hand/forearm; neural injury to the brain or spinal cord; muscular impairment or paralysis; inflammation; burns; and other reasons. The psychological consequences of such incapacity may be very damaging to the rehabilitation process of these handicapped persons, who are totally dependent on the assistance of another person for carrying out this kind of activity.

Various attempts have been made to develop a device which enables such handicapped persons to independently turn the pages of a book, magazine, and the like. Prior art includes a variety of automatic and manual devices. Examples of automatic page turners are disclosed in U.S. Pat. No. 4,031,644; 4,553,467; 4,644,675; 4,685,374; 4,719,712; and 4,780,977.

However, most of these devices are not in frequent use for the following reasons: most of them are large and heavy, complex and difficult to handle, and expensive; the disabled person is completely dependent on the assistance of another person in order to carry, set, and disassemble the device; the mobility of these devices is very limited, narrowing their usage to the immediate home environment of the disabled person; most of the devices are operated by pushing a button, thus remaining the user passive, not practicing much of the motor functions he is capable of. This has negative consequences on the rehabilitation process of such a person, due to psychological effects such as damage to his self esteem, and physical effects such as atrophy of unexercised muscles.

There is thus a widely recognized need for, and it would be highly advantageous to have, a personal device for turning pages of a book, magazine, newspaper, etc., which is compact, portable and easy to handle; which enables ready and independent use by the handicapped person; and which is beneficial to the rehabilitation process of the user in terms of psychological and physical effects.

It would be further advantageous to have such a device, which allows the handicapped user to perform other functions related to paper handling, such as transferring, sorting and linking of pages.

SUMMARY OF THE INVENTION

According to the present invention there is provided a personal device which enables persons who suffer from disability of their fingers, hand, forearm or complete arm to readily turn pages of a book, magazine, newspaper, etc., and to perform other function related to paper handling, such as sorting, linking and transferring of pages from one place to another.

The invention is in the form of a flexible bracelet which can be attached around the user's fingers, hand, forearm, foot or head, depending on the particular disability. It includes a padded flexible strap to which a flat rigid surface is attached. A delimited part of said surface is overlaid with a suitable sticky material, so that the surface adheres firmly to the page to be turned when pressed against it, and separates readily when pulled out of said page without leaving any marks.

According to further features in preferred embodiments of the invention described below, the device can be adapted for use with small books and the like, to further include a flat curved rigid extension which prevents the turned page from turning back to its initial position. The flat rigid extension may be threaded into a small pocket located at the end of said strap.

According to still further features in the described preferred embodiments, the device can include a ring-like accessory attached to one end of the flexible strap, so as to facilitate the fastening of said strap around the user's limb/head.

According to another embodiment the invention includes a rigid strap, said strap may feature an upper or lateral opening for wearing the device on the user's limb. A delimited part of the exterior surface of the rigid strap is overlaid with a sticky material.

According to further features in said embodiment, a flat curved rigid extension can be attached to or made as an integral part of the rigid strap, in order to adapt it for use with small books and the like.

According to yet another embodiment the invention includes a stick-like accessory the tip of which is overlaid with a sticky material. This embodiment is adapted for users who suffer from disability of their four limbs, and are able to use their mouth to grasp said stick-like accessory.

The present invention successfully addresses the shortcomings of the presently known configurations by providing a personal and portable device, which enables the handicapped person to readily turn pages and bindings of various sizes and thicknesses, and to readily perform additional functions related to paper handling, such as sorting, linking and transferring of pages from one place to another. Contrary to the presently known configurations, the device is compact and light, simple and easy to use, even by those with impaired cognitive abilities, so that the disabled user is not dependent on the assistance of another person in order to carry and use the device. The device is highly mobile, and can be comfortably used in public places such as libraries, book shops, and a work-place. In addition, the device is aesthetically pleasing, in contrast with the cumbersome and complex presently known configurations.

Furthermore, the device enables the handicapped user to practice unexercised motor functions such as internal and external rotation of the shoulder, supination and pronation of the forearm, and actuation of the wrist muscles, which has contributory physical and psychological effects on the rehabilitation process of the user. The beneficial psychological effects stem from the enhanced self-image of the user who is able to be more self-reliant than otherwise possible and who is able to engage in the highly pleasurable activity of reading. Finally, the device is durable and inexpensive, which makes it accessible to any handicapped person.

The present invention discloses a novel device made up of: a bracelet-like accessory; a sticky surface which is attached to or made as an integral part of said bracelet-like accessory; and an optional flat curved rigid extension which is attached to or made as an integral part of said bracelet-like accessory. The user wears the device on his fingers/hand/forearm/foot/head, depending on his particular disability. He then brings his arm/foot/head down on the page to be turned so that the sticky surface adheres near the edge of the page, then moves his arm/foot/head away, dragging the page with him so as to turn it. The user then pulls the sticky surface out of the page by a slight movement. While handling small books, the user captures the page with the flat curved rigid extension immediately after said page is released, preventing the page from turning back to its original position. While transferring a sheet from one place to another, the sheet is released by immobilizing the sheet with, for example, the other arm, and pulling the device away from the sheet.

BRIEF DESCRIPTION OF THE DRAWINGS

The invention is herein described, by way of example only, with reference to the accompanying drawings, wherein:

FIG. 1*a* is a schematic side view of a device according to the present invention, in a configuration adopted while attached around the user's fingers/hand/forearm/foot;

FIG. 1*b* is a perspective view of the device shown in FIG. 1*a;*

FIG. 2*a* is a schematic side view of an embodiment adapted for use with small books, in a configuration adopted while attached around the user's fingers/hand/forearm/foot;

FIG. 2*b* is a perspective view of the device shown in FIG. 2*a;*

FIG. 6*a* is a side view of another embodiment adapted for use with small books;

FIG. 6*b* is a perspective view of the device shown in FIG. 6*a;*

FIG. 7*a* is a side view of an alternative embodiment of the device shown in FIG. 6*a;*

FIG. 7*b* is a perspective view of the device shown in FIG. 7*a*.

DESCRIPTION OF THE PREFERRED EMBODIMENTS

Figure 3A:
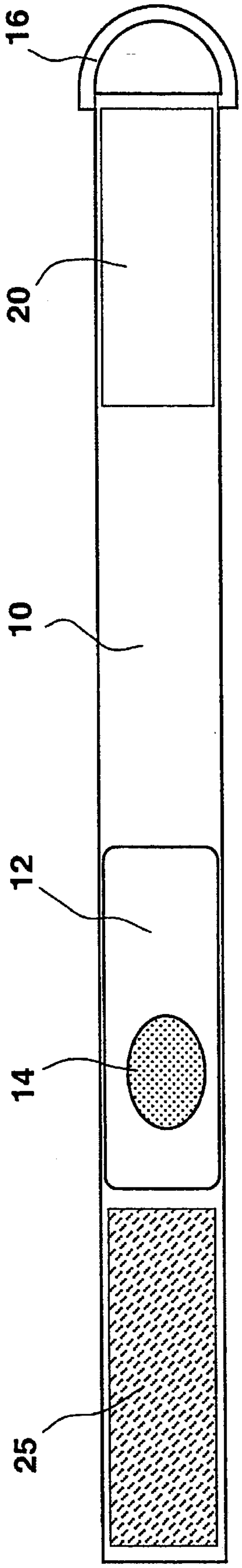
FIG. 3*a* is a top view of the device shown in FIG. 2*a*, in an extended configuration; except that extension 18 is not shown.

The present invention is of a personal device which enables the handicapped person to readily turn pages of books, magazines, newspapers, albums, etc., and to readily perform other functions related to paper handling, such as sorting, linking and transferring of pages from one place to another. Specifically, the present invention can be used to turn pages and bindings of various sizes and thicknesses, and to manipulate sheets of various sizes for different needs, such as handling documents, organizing a work-table, and various types of office jobs. It can be constantly carried as an intimate accessory, and be comfortably used in public places such as libraries, book shops and a work place.

Devices according to the present invention allow the handicapped user to conduct his or her life more independently than heretofore possible with regard to paper handling, with significant psychological benefits.

The principles and operation of a device according to the present invention may be better understood with reference to the drawings and the accompanying description.

Referring now to the drawings, FIGS. 1–5 illustrate a device according to the present invention. The device includes a flexible strap 10, said strap having an interior and an exterior facet. Flexible strap 10 can be of various lengths, in order to allow its attachment around the user's fingers, hand, forearm, foot or head, according to the particular disability and according to the individual dimensions of the specific user. Flexible strap 10 may preferably be made of fabric, or any other material. The interior facet of flexible strap 10 is preferably padded with, for example, a sponge 26 or any other padding in order to prevent development of pressure sores, minimize sweating, and provide comfort to the user.

A flat rigid surface 12 is preferably attached to the exterior facet of flexible strap 10. Flat rigid surface 12 may preferably be made of plexiglas or any thermoplastic material, and its width is preferably identical to that of flexible strap 10.

Figure 3B:
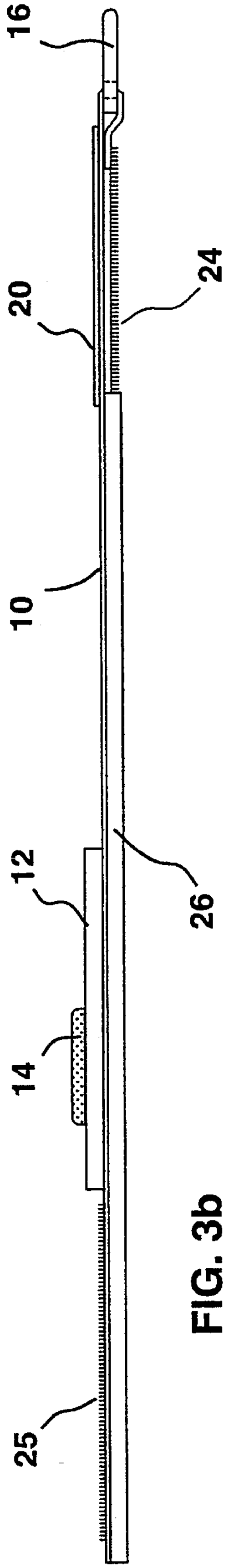
FIG. 3*b* is a side view of the device shown in FIG. 3*a;*

As shown in FIG. 3, the attachment of flat rigid surface 12 to flexible strap 10 may be made by means of adhesive material and/or seams.

Figure 4A:
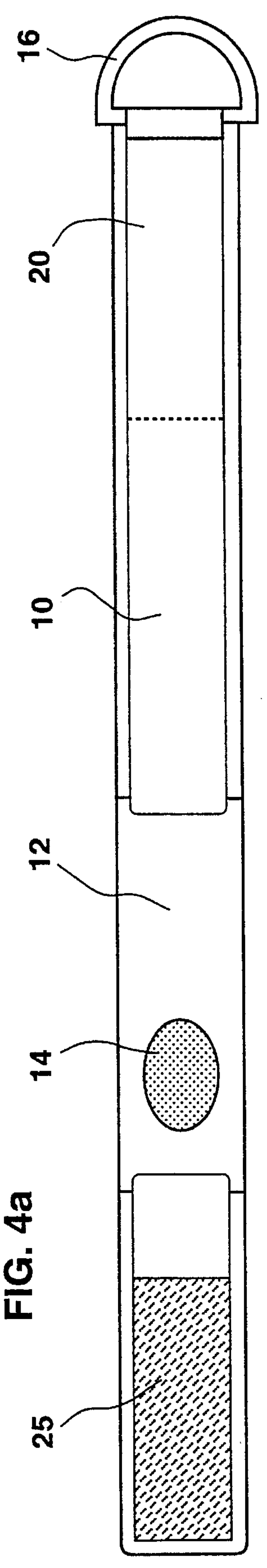
FIG. 4*a* is a top view of an alternative embodiment of the device shown in FIG. 3*a*, in an extended configuration.
Figure 4B:
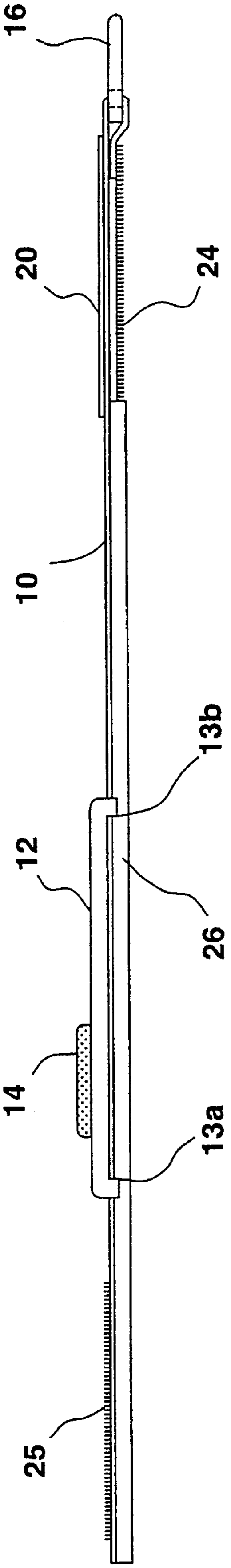
FIG. 4*b* is a side view of the device shown in FIG. 4*a;*

Another possible configuration is shown in FIG. 4, where flat rigid surface 12 features two slits 13*a* and 13*b* located at its ends, through which flexible strap 10 is threaded.

Figure 5A:
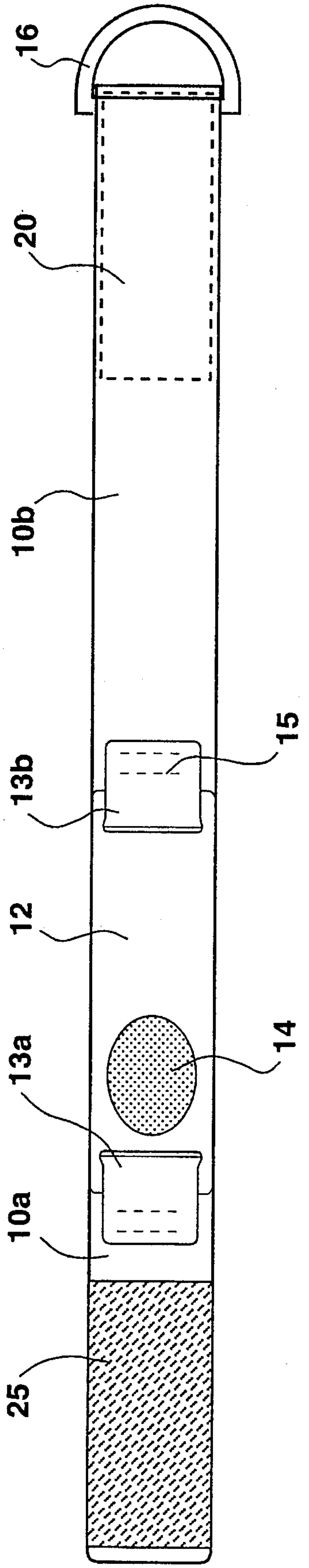
FIG. 5*a* is a top view of a further alternative embodiment of the device shown in FIG. 3*a*, in an extended configuration.
Figure 5B:
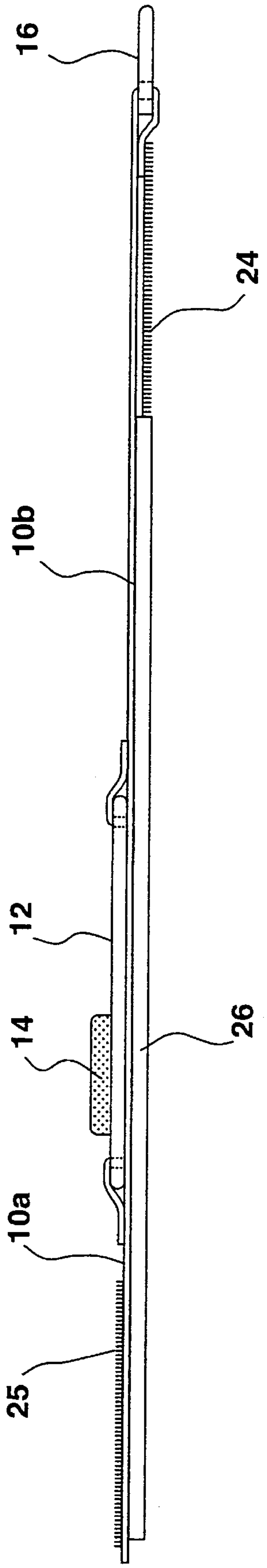
FIG. 5*b* is a side view of the device shown in FIG. 5*a;*

Yet another configuration is shown in FIG. 5, where flat rigid surface 12 features two slits 13*a* and 13*b* located at its ends, through each of which a separate piece of flexible strap 10*a* and 10*b* is threaded, and fastened by means of seams 15.

With continued reference to FIGS. 1–5, a delimited part of the exterior side of flat rigid surface 12 is preferably overlaid with a disposable two-sided adhesive material 14, similar to the Post-It Cover-Up tape sold by the 3M company of St. Paul, Minn., which may be, for example, Stick-Stuck, Blue Tuck, Yellow Tuck, Postard, Plastick, or any other appropriate adhesive. A basic characteristic of such an adhesive material is that it adheres firmly to the page to be turned when pressed against it, and separates readily when pulled out of it without leaving any marks.

As further shown in FIGS. 1–5, the device includes attachment means, for example, refined Velcro 24 and unrefined Velcro 25, for detachably attaching flexible strap 10 to the user's fingers/hand/forearm/foot/head. The device may conveniently include a clasp, or a ring-like accessory 16 connected to flexible strap 10, in order to facilitate the attachment of flexible strap 10 about the user's limb/head. Ring-like accessory 16 can be manipulated using the user's other hand, his mouth, and the like.

As shown in FIGS. 2*a* and 2*b*, the device can be adapted for use with small books and the like where the turned page might turn back to its original position, to further include a flat curved rigid extension 18 which keeps the page turned until the user has a chance to immobilize the page and prevent it from turning back. Flat rigid extension 18 may be threaded into a small pocket 20 (FIGS. 3–5) located at the end of flexible strap 10, and attached to it by means of scotch tape, or similar connections. Flat rigid extension 18 may preferably be made of plexiglas or any thermoplastic material.

Referring now to FIGS. 6–7, these illustrate another embodiment of the invention, where the entire device is rigid, and may preferably be made of plexiglas or any thermoplastic material, or any other material. This embodiment includes a rigid strap 30, said strap having an interior and an exterior surface. The interior surface of rigid strap 30 is preferably padded with a sponge 26 or any other padding. A delimited part of the exterior surface of rigid strap 30 is preferably overlaid with a disposable stain-free two-sided adhesive material 14.

As shown in FIG. 6, flat curved rigid extension 18 may be attached to rigid strap 30 by means of assembly 32 or similar connections. This configuration may feature an upper opening 34.

Another possible configuration is shown in FIG. 7, where flat curved rigid extension 18 is made as an integral part of rigid strap 30, yielding an extended rigid strap 36. This configuration may feature a lateral opening 38.

Figure 8A:
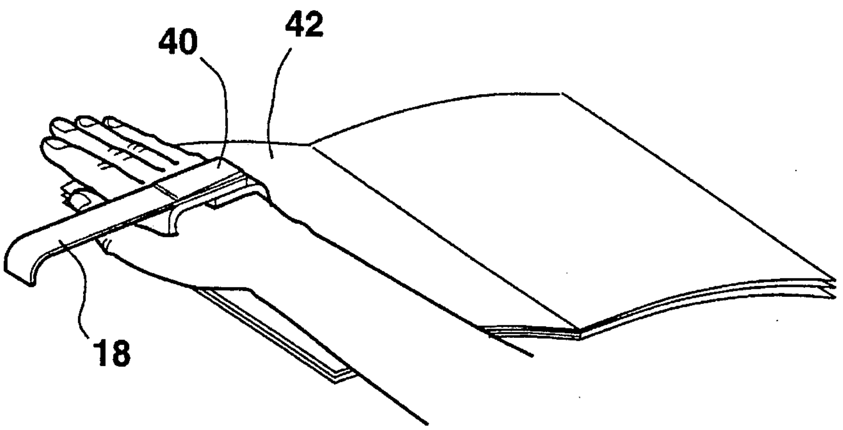
FIG. 8*a, b* and *c* illustrate the manner in which a device according to the present invention is used.
Figure 8B:
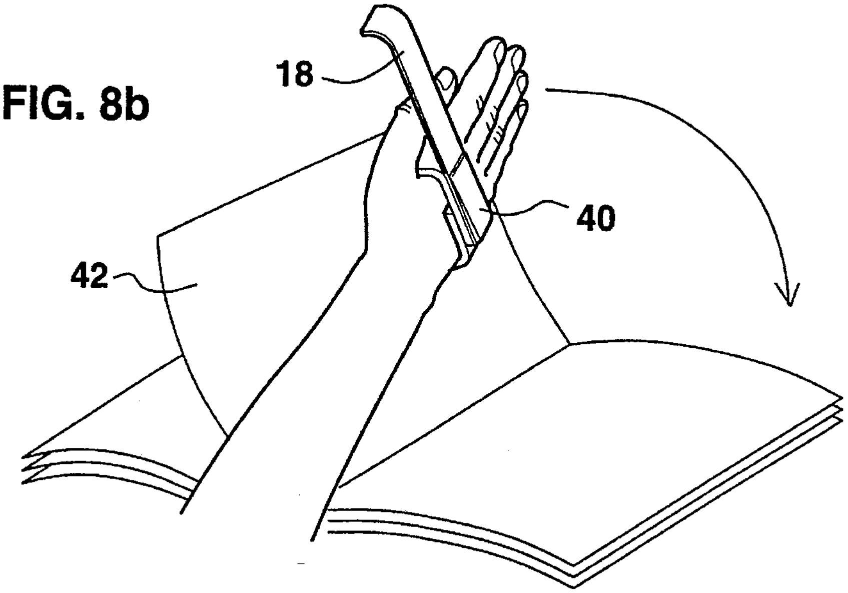
Figure 8C:
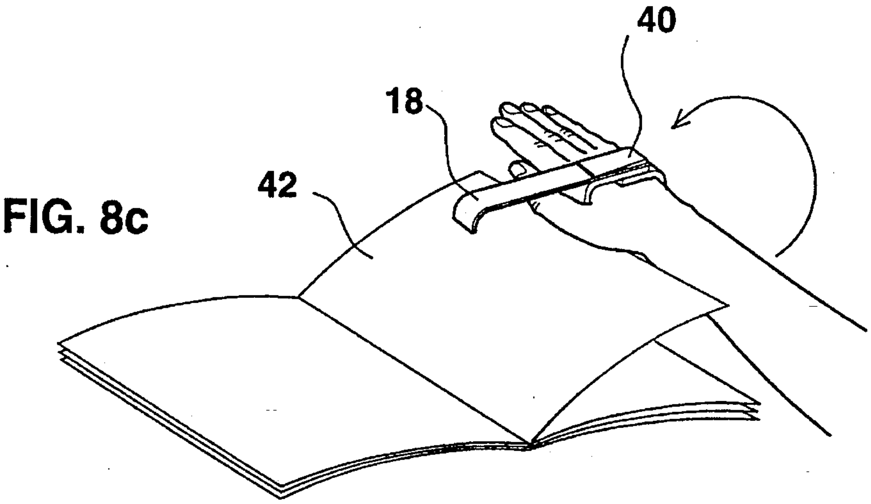

FIG. 8*a*, *b* and *c* exemplify the manner in which an embodiment adapted for use with small books is used. According to this illustration the user wears the device 40 on his hand. The user brings his arm down on the page to be turned 42 so that two-sided adhesive material 14 placed at the bottom of device 40 adheres near the corner of page 42 (FIG. 8*a*). He then moves his arm away, dragging page 42 with him so as to turn it (FIG. 8*b*). The user then pulls device 40 out of page 42 by a slight movement, and immediately captures page 2 with flat curved rigid extension 18, preventing page 42 from turning back to its original position (FIG. 8*c*).

While the user uses device 40 to transfer a sheet from one place to another, he brings his arm down on the sheet to be transferred, so that the sticky surface adheres near the upper edge of the sheet, and then transfer said sheet to the desired location. He then releases the sheet by immobilizing it with, for example, his other arm and pulling the device away from the sheet.

Figure 9:
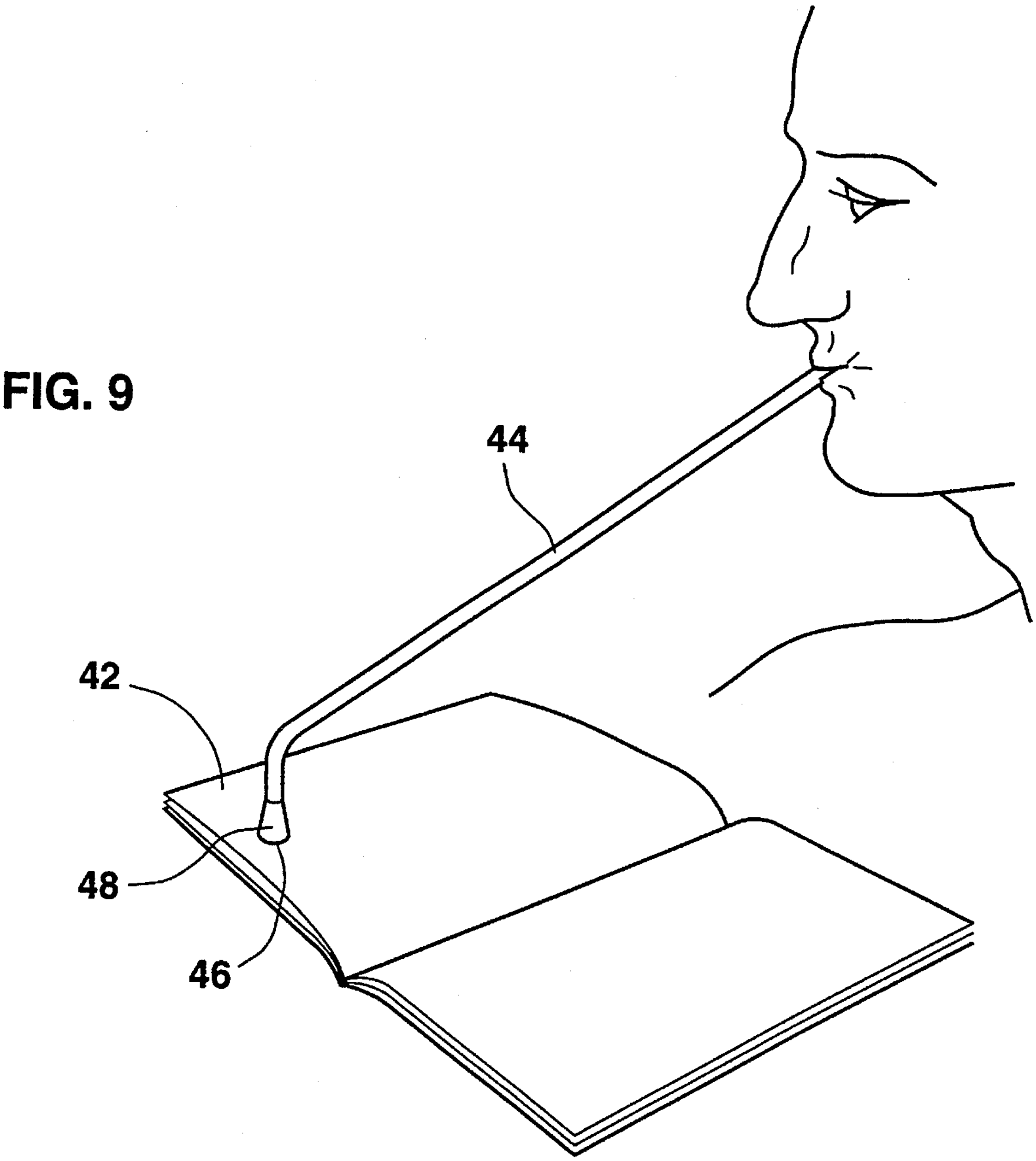
FIG. 9 illustrates the manner in which another embodiment of the invention is actuated by the user's mouth.

FIG. 9 illustrates the manner in which yet another embodiment of the invention, adapted for users who suffer from disability of their four limbs, is used. This embodiment is in the form of a rigid stick 44 made of, for example, aluminum, wood, or any other material, said stick having a tip 46. A cover 48 made of, for example, plastic, may preferably be connected to tip 46. Cover 48 is preferably overlaid with a disposable stain-free two-sided adhesive material 14. The user grasps the end of stick 44 with his mouth and brings it down on the page to be turned 42. He then moves his head dragging page 42 with him so as to turn it, and releases page 42 by a slight movement of his head.

It can be seen that the use of a device according to the present invention is highly beneficial for persons who suffer from disability of their fingers, hand, forearm or entire limb.

While the invention has been described with respect to a limited number of embodiments, it will be appreciated that many variations, modifications and other applications of the invention may be made.

What is claimed is:

1. A device for facilitating the turning of pages using a user's major limb, comprising:

(a) a strap configured for attachment about the limb of the user, said strap having an inner and an outer surface;

(b) attachment means connected to said strap for detachably attaching the device to the limb of the user;

(c) an adhesive material connected to said outer surface of said strap for alternately adhering and releasing the pages;

(d) an extension connected to said strap for preventing the return of a turned page to its original position.

2. The device of claim 1, wherein said strap is flexible.

3. The device of claim 2, wherein said attachment means are made of Velcro.

4. The device of claim 3, further comprising a ring connected to said strap for facilitating the attachment of said strap about the limb of the user.

5. The device of claim 2, further comprising a rigid surface connected to said strap, said adhesive material connected to said rigid surface.

6. The device of claim 1, wherein said strap is rigid.

7. The device of claim 6, wherein said extension is made as an integral part of said strap.

8. The device of claim 7, wherein said strap includes an opening for facilitating the attachment of said strap about the limb of the user.

9. The device of claim 8, further comprising a padding connected to said inner surface of said strap.

10. The device of claim 1, wherein said adhesive material is two-sided.

11. The device of claim 1, wherein said adhesive material is stain free.

12. The device of claim 1, wherein said adhesive material is disposable.

13. The device of claim 1, wherein said strap includes a pocket.

* * * * *